US006842837B1

(12) United States Patent
Peting et al.

(10) Patent No.: US 6,842,837 B1
(45) Date of Patent: Jan. 11, 2005

(54) METHOD AND APPARATUS FOR A BURST WRITE IN A SHARED BUS ARCHITECTURE

(75) Inventors: Mark Peting, Tigard, OR (US); Hens Vanderschoot, Tigard, OR (US)

(73) Assignee: Digeo, Inc., Kirkland, WA (US)

( * ) Notice: Subject to any disclaimer, the term of this patent is extended or adjusted under 35 U.S.C. 154(b) by 177 days.

(21) Appl. No.: 09/784,274

(22) Filed: Feb. 13, 2001

(51) Int. Cl.[7] .............................................. G06F 12/00
(52) U.S. Cl. ........................ 711/168; 711/5; 711/167; 711/169; 711/173; 710/35; 710/36; 710/37; 710/39; 710/52; 710/58; 365/189.04; 365/194; 365/203
(58) Field of Search ..................... 711/5, 167, 168–169, 711/173, 105, 147.167; 710/1–7, 20–22, 35–37, 39–40, 52, 58, 71, 33, 115, 113; 365/189.04, 194, 203, 230.03, 230.05

(56) References Cited

U.S. PATENT DOCUMENTS

| | | | | |
|---|---|---|---|---|
| 4,970,690 A | * | 11/1990 | Sherman | 365/189.02 |
| 5,440,523 A | * | 8/1995 | Joffe | 365/230.05 |
| 5,758,089 A | * | 5/1998 | Gentry et al. | 709/234 |
| 5,758,191 A | * | 5/1998 | Kasebayashi et al. | 710/56 |
| 5,761,725 A | * | 6/1998 | Zeller et al. | 711/146 |
| 5,860,027 A | * | 1/1999 | Leyrer et al. | 710/66 |
| 5,875,452 A | * | 2/1999 | Katayama et al. | 711/105 |
| 6,061,759 A | * | 5/2000 | Guo | 711/105 |
| 6,112,261 A | * | 8/2000 | Simms et al. | 710/35 |
| 6,216,178 B1 | * | 4/2001 | Stracovsky et al. | 710/6 |
| 6,453,370 B1 | * | 9/2002 | Stracovsky et al. | 710/36 |
| 6,505,259 B1 | * | 1/2003 | Garcia et al. | 710/35 |
| 6,646,928 B2 | * | 11/2003 | Bondurant | 365/189.05 |

FOREIGN PATENT DOCUMENTS

EP        0 438274 A2  *  7/1991  ........... H04L/12/56

* cited by examiner

*Primary Examiner*—Matthew Kim
*Assistant Examiner*—Zhuo H. Li
(74) *Attorney, Agent, or Firm*—Kory D. Christensen; Stoel Rives LLP

(57) ABSTRACT

A method and apparatus for a burst mode write in a shared bus architecture comprising detecting a write data burst, determining if at least one memory unit is available to receive the write data burst, writing the write data burst to the at least one memory unit if the at least one memory unit is available to receive data. Storing a first portion of the write data burst in a buffer, concurrently with activating the at least one memory unit to receive data, if the at least one memory unit is not available to receive data; writing a second portion of the write data burst to the at least one memory unit when the at least one memory unit is available to receive data, and writing the first portion of the write data burst from the buffer to the at least one memory unit after writing the second portion of the write data burst.

31 Claims, 7 Drawing Sheets

METHOD AND APPARATUS FOR A BURST WRITE IN A SHARED BUS ARCHITECTURE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to the field of computer systems. In particular, the present invention is related to a method and apparatus for writing data to memory.

2. Description of the Related Art

A processor, for example, a MIPS processor manufactured by MIPS Technologies, Inc., of 2011 N. Shoreline Blvd, Mountain View, Calif. 94039-7311, outputs eight data words during sequential clock cycles of a burst mode write cycle to memory. One skilled in the art will appreciate that a burst mode write cycle occurs when a processor outputs a burst of data, as compared with a word of data, for a limited amount of time. However, prior to storing the data words in memory, the memory, such as Synchronous Dynamic Random Access Memory (SDRAM), has to be precharged and activated. Precharging and activating SDRAM comprises a memory controller issuing precharge and activate commands to the SDRAM. These commands take at least four system clock cycles to prepare the SDRAM to begin accepting data.

FIG. 1 illustrates a bus architecture called a separate bus architecture, wherein the processor bus and the memory bus are separate and distinct from each other. In such a bus architecture, when the processor 105 accesses memory 115, for example, a SDRAM bank, and the SDRAM bank is unavailable to receive data output from the processor, the data is temporarily stored in a buffer (not shown) within memory controller 110. Concurrently with storing data in the memory controller's buffer, the memory controller issues a precharge and activate command to prepare the SDRAM bank to receive the data being stored. As soon as the SDRAM is available to receive data, i.e., after the precharge and activate commands have been issued to the SDRAM bank, and before the entire burst of data is stored in the buffer within the memory controller 110, data from the buffer in the memory controller is written to SDRAM. The separate bus architecture makes it possible to write data to the SDRAM bank as soon as the SDRAM bank is available to receive data, while the processor is concurrently outputting data to the buffer in the memory controller. Hence, this bus architecture takes fewer system clock cycles for a processor's burst write.

However, the separate bus architecture has the disadvantage of requiring additional system clock cycles when reading data, because the data from the SDRAM has to be first read into a buffer in the memory controller prior to being input into the processor.

To shorten the data read process, a bus architecture called the shared bus architecture, as illustrated in FIG. 2, is employed. The shared bus architecture improves the data read performance but has the disadvantage of requiring additional system clock cycles during burst mode write (hereafter burst write) cycles, as discussed below.

During a burst write in a shared bus architecture 200, when a burst of data is to be written to memory 215 from processor 205 and the memory bank is unavailable, for example, due to the memory bank not being precharged and activated, the burst of data is temporarily stored in a buffer (not shown) in a memory controller 210. The entire burst of data is stored in the buffer, even though sometime during the burst write, the memory may become available to receive the data. The reason for this is that during the burst write, processor 205 has control of the bus, and only relinquishes control of the bus to the memory controller when the entire burst of data has been stored in the buffer. What is needed, therefore, is a method and apparatus to speed up the burst mode write by a processor in the shared bus architecture.

BRIEF SUMMARY OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

Described is a method and apparatus for a burst mode write in a shared bus architecture. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention.

Parts of the description will be presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
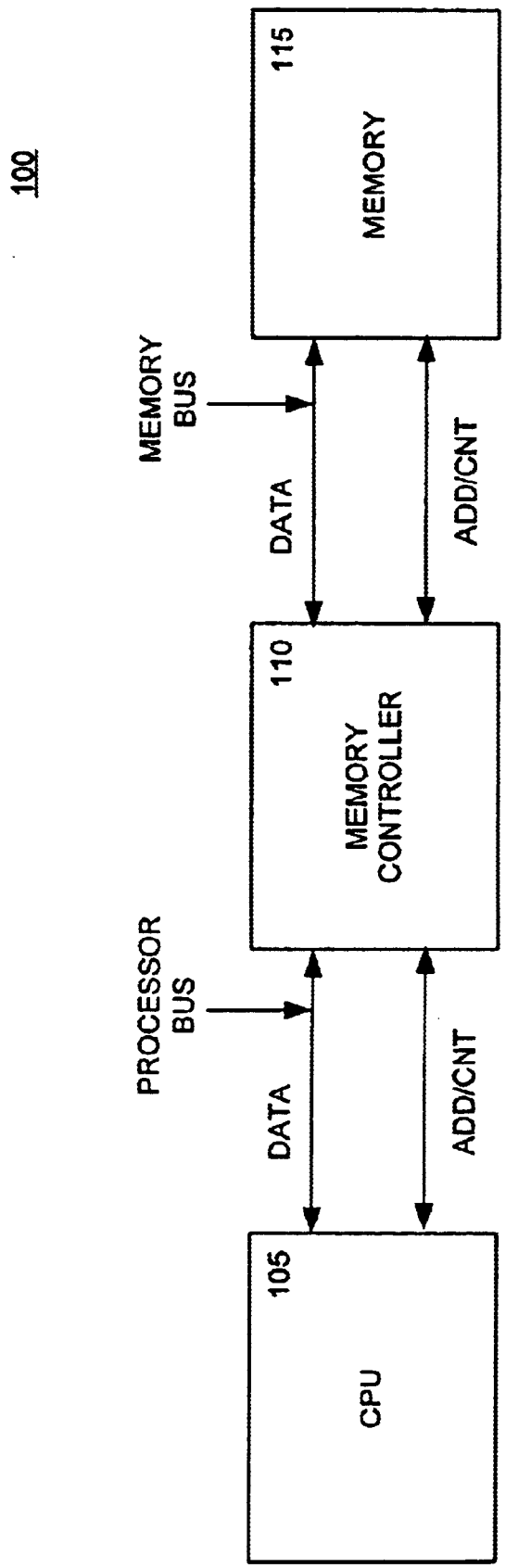
FIG. 1 illustrates a separate bus architecture.
Figure 2:
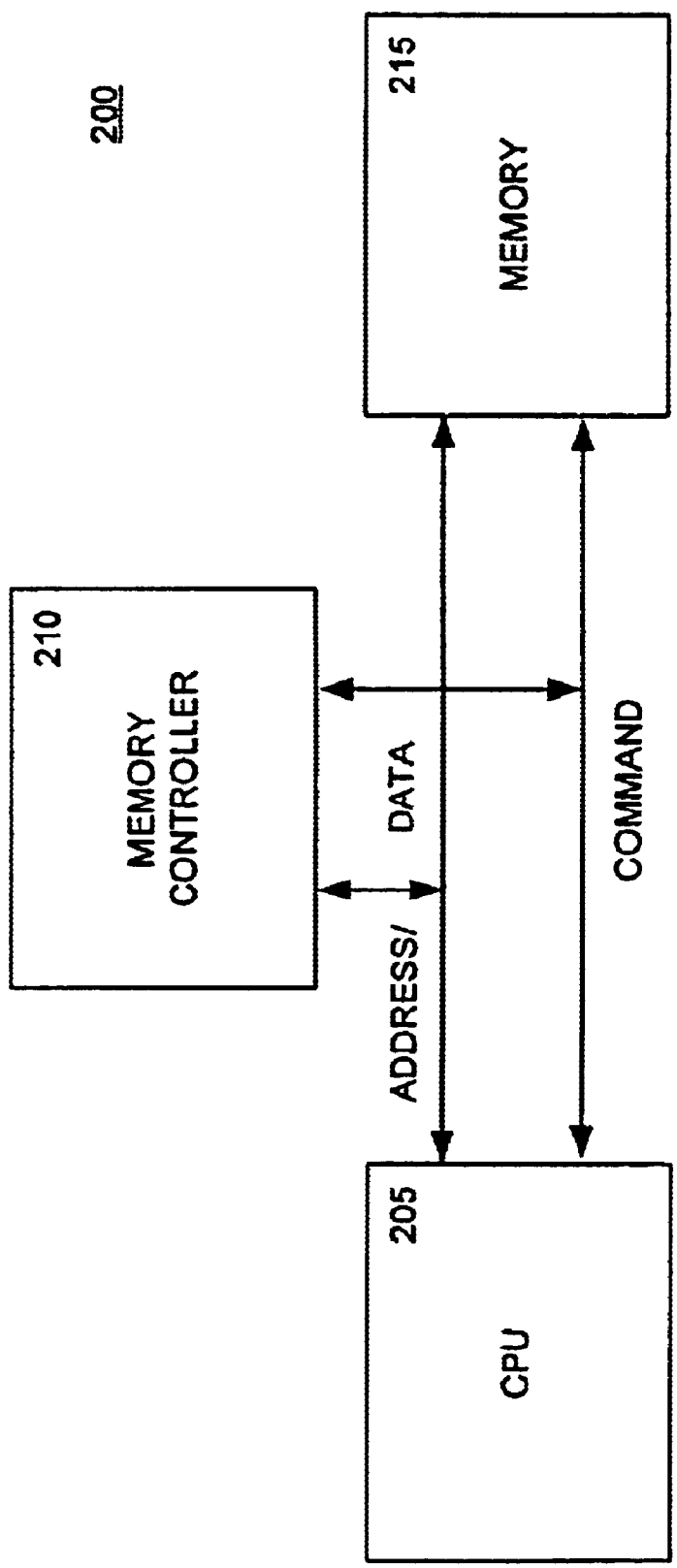
FIG. 2 illustrates shared bus architecture.
Figure 3:
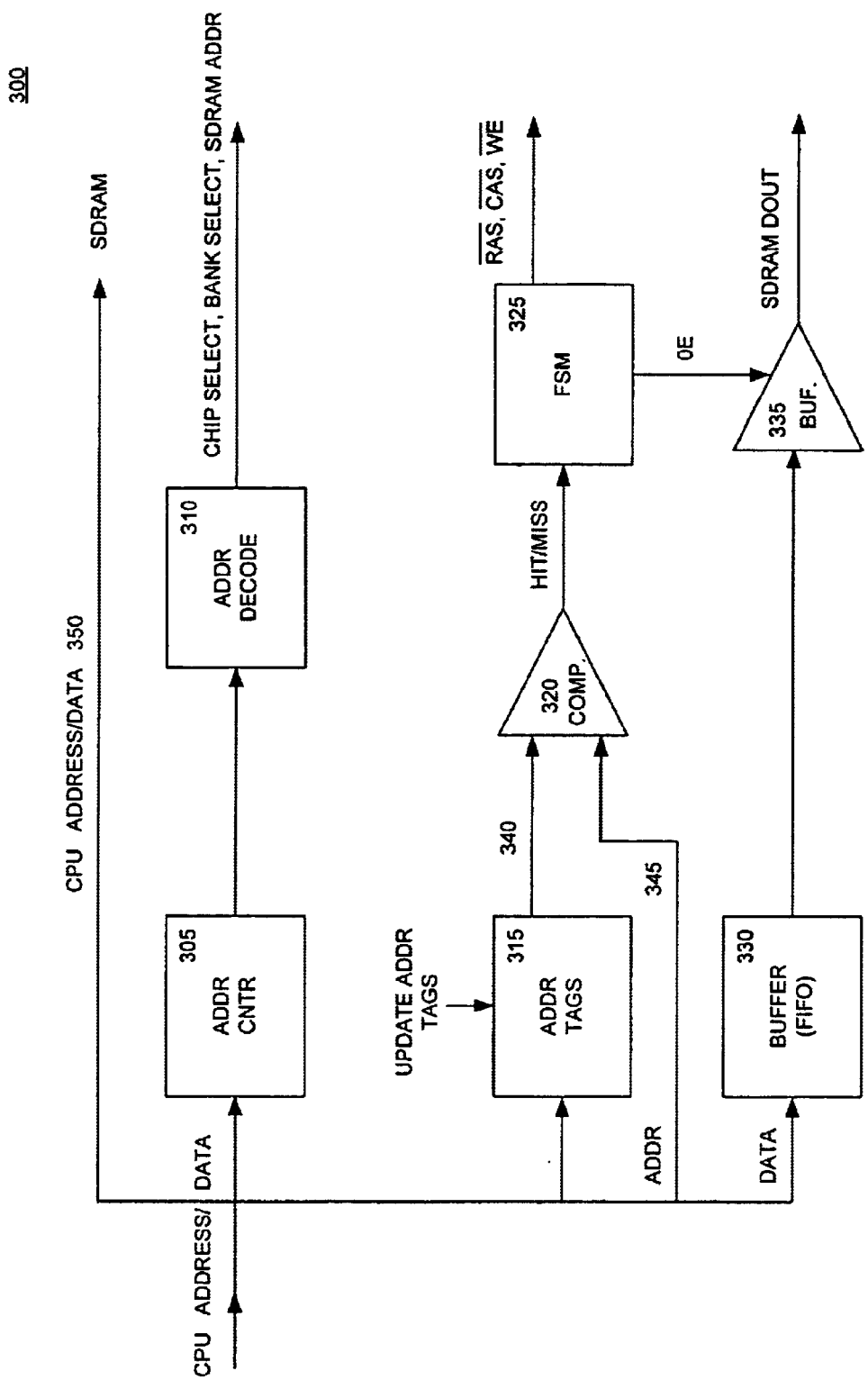
FIG. 3 illustrates a block diagram of an embodiment of the invention.

FIG. 3 illustrates a block diagram of an embodiment of the invention, wherein a burst mode write of data to memory is performed in fewer system clock cycles as compared with the prior art. The circuit illustrated in FIG. 3 may form part of a memory controller, however, in alternate embodiments the circuit shown in FIG. 3 may be implemented on a stand alone circuit board or may even form part of some other circuit that monitors address and data output from a processor or other device, e.g., a peripheral device in a direct memory access transfer. FIG. 3 illustrates a circuit 300 wherein a first part of the data burst from a processor (not shown) is stored in buffer 330, and concurrently with storing data in buffer 330, a memory bank (not shown) is prepared to receive a second part of the data burst. Once the memory bank is available to receive data, the second part of the data burst is written directly to the memory bank, followed by circuit 300 writing the first part of the data burst to the memory bank from buffer 330.

Circuit 300 comprises address counter 305 and address decoder 310 communicatively coupled to address counter 305 to decode the address output by, for example, a processor, and to select the SDRAM bank that is being addressed. In addition, circuit 300 comprises a comparator 320 that compares the address of the memory bank that the processor addresses during a write cycle with address tags 315. The address tags indicate which memory bank is precharged and activated and, hence, is currently available to receive data. During the address comparison by comparator 320, if there is a match or 'hit' condition, indicating the memory bank the processor addresses is available to receive data, the entire data burst is immediately written directly to that memory bank via the address/data bus 350. In particular, the output of comparator 320 causes finite state machine 325 to send $\overline{CAS},\overline{WE}$ signals to the SDRAM thereby effecting an immediate write.

However, if during the address comparison by comparator 320, there is a 'miss' condition, i.e., an indication that the address tags do not match the address output by the processor, finite state machine 325 tristates buffer 335, thereby directing the output data burst from the processor to buffer 330. Concurrently with storing data in data buffer 330, the memory bank addressed is issued a precharge and activate command using the appropriate $\overline{RAS},\overline{WE}$ commands by finite state machine 325 to prepare the memory bank to receive data. Sometime during the storing of data in the buffer 330, the memory bank becomes available to receive data. The availability of the memory bank to receive data is indicated by the address tags 315 being updated to include the address of the memory bank. These tags are then driven onto input line 340 coupled to an input of comparator 320. The output of comparator 320 changes state, indicating a 'hit' condition, when the a tags match the address of memory that is being accessed and driven on line 345. As soon as a 'hit' condition is indicated by comparator 320, the remainder of the data burst is written directly to the memory bank by finite state machine 325 issuing $\overline{CAS},\overline{WE}$ signals to the memory bank. After storing the remainder of the data burst in the memory bank, the bus is released. After the bus is released, the FSM drives the output enable high, causing the first part of the data burst that is stored in buffer 330 to be written to memory bank via buffer 335.

Writing a burst of data to a memory bank as described above is efficient as it saves time by performing the burst write to memory in fewer system clock cycles in a system that employs a shared bus architecture. The savings in time achieved by this method will now be explained using the timing diagrams in FIGS. 5 and 6.

Figure 5:
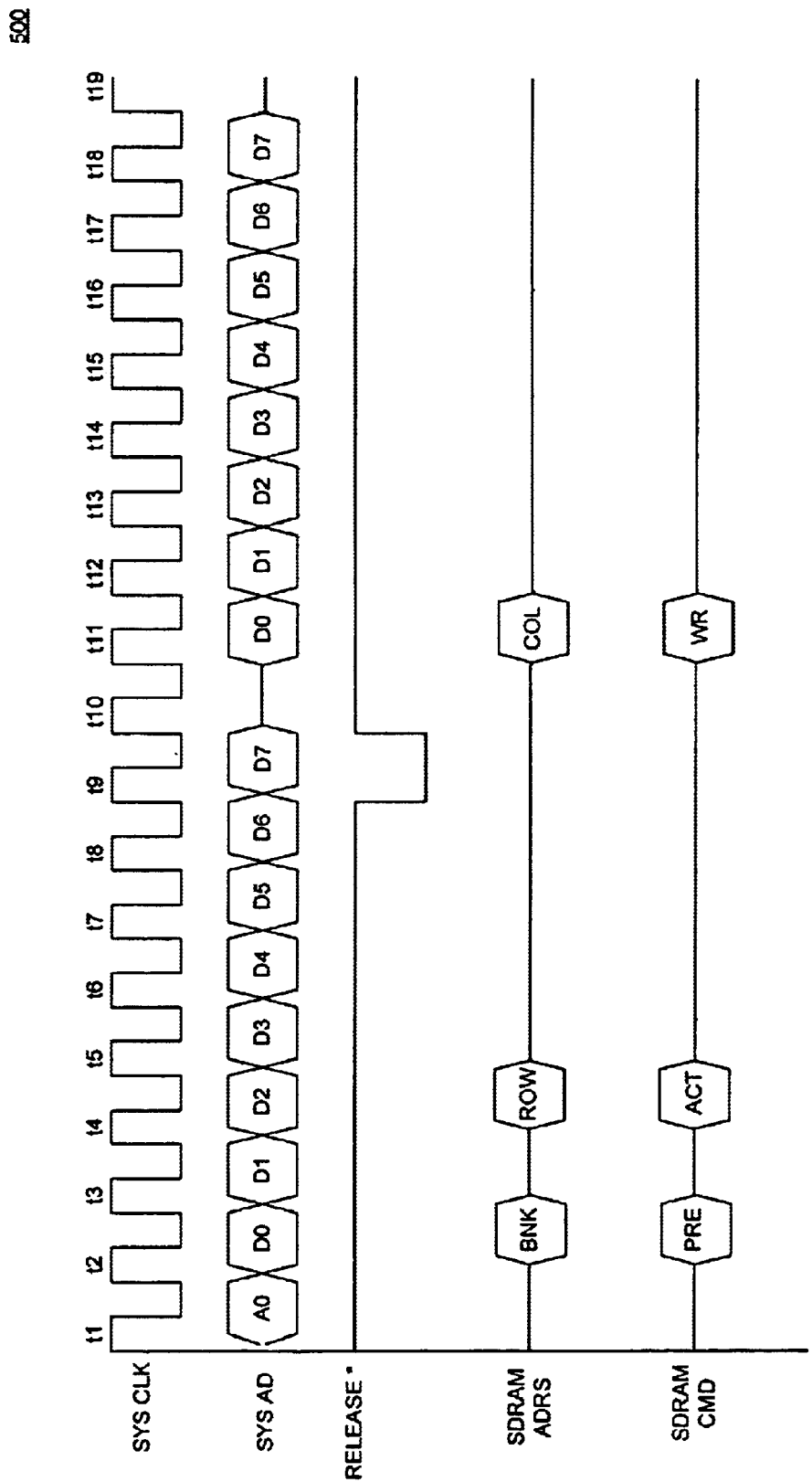
FIG. 5 is a timing diagram illustrating a prior art embodiment.

FIG. 5 illustrates a timing diagram of a prior art embodiment in a shared bus architecture wherein the entire data burst is stored in a buffer upon the detection of a memory 'miss' condition. Only after the entire data burst is written to memory, and the bus is released, is the data transferred from the buffer to the memory bank that was addressed. In FIG. 5, at system clock cycle t1, a processor, for example, outputs the address of the memory bank where the data burst is to be stored. However, if a memory 'miss' condition exists, wherein the memory bank addressed is not precharged and activated, the data burst, during system clock cycles t2–t9, is stored in a buffer. During clock cycles t2–t4, the memory bank addressed is issued precharge and activate commands to prepare the memory bank to receive data. Sometime between system clock cycles t4 and t11, the memory bank is available to receive data. However, due to the bus being controlled by the processor during this time, the data from the buffer cannot be written to the memory bank. At t9, the processor releases the bus, and at t11, data is written from the buffer to the memory bank addressed by the processor. As illustrated in FIG. 5, this process takes at least 18 system clock cycles.

Figure 6:
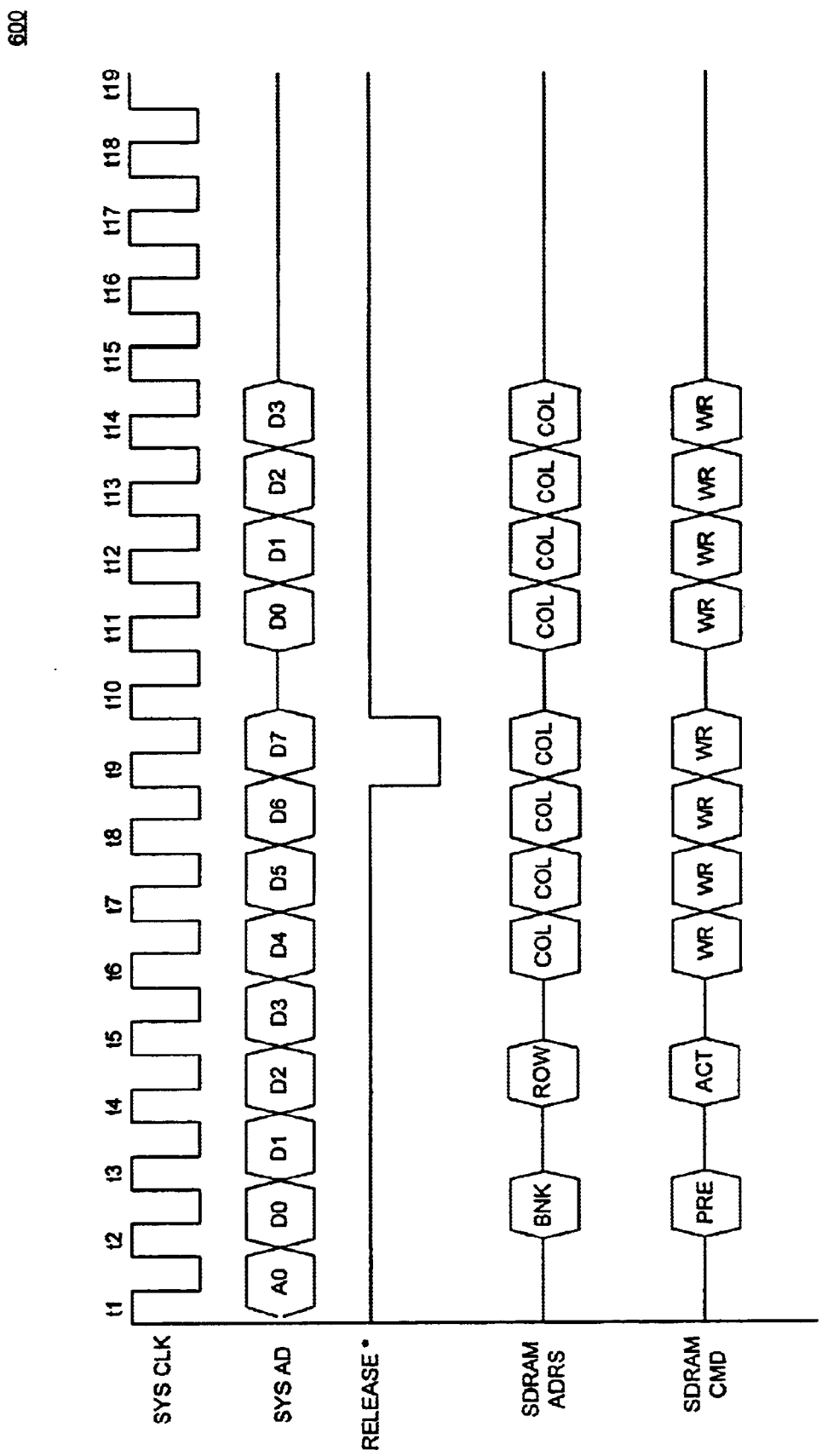
FIG. 6 is a timing diagram illustrating an embodiment of the invention.

FIG. 6 illustrates a timing diagram of an embodiment of the invention. At system clock cycle t1, a processor, for example, outputs the address of the memory bank where the data burst is to be stored. For the same memory 'miss' condition described earlier, between system clock cycles t2–t4, the memory bank addressed by the processor is precharged and activated. At system clock cycle t6, the memory bank is available to receive data, and at system clock cycles t6–t9, data D4–D7 from the processor is written to the memory bank. During system clock cycles t2–t5, the memory bank is unavailable to receive data and, hence, the data D0–D3 from the processor is stored in a buffer during this time interval. At system clock cycle t9, the processor releases the bus, and at t11, data D0–D3 stored in the buffer during system clock cycles t2–t5 is transferred to the memory bank by the memory controller during system clock cycles t11–t14. Thus, the entire data burst is transferred by the processor to the memory bank in 14 system clock cycles as compared with 18 system clock cycles as is described in the prior art embodiment.

Although the embodiment is described as storing four data words in the buffer, and four data words in the memory bank, one skilled in the art will appreciate that other embodiments of the invention may store various combinations of data words in the buffer and in the memory bank. For example, another embodiment may store one data word in the buffer and seven data words in the memory bank prior to transferring the word stored in the buffer to the memory bank, yet another embodiment may store two data word in the buffer and six data words in the memory bank, and so on. The number of words that are stored in the buffer is dependant upon the speed with which the memory bank is precharged and activated to receive data.

Figure 4:
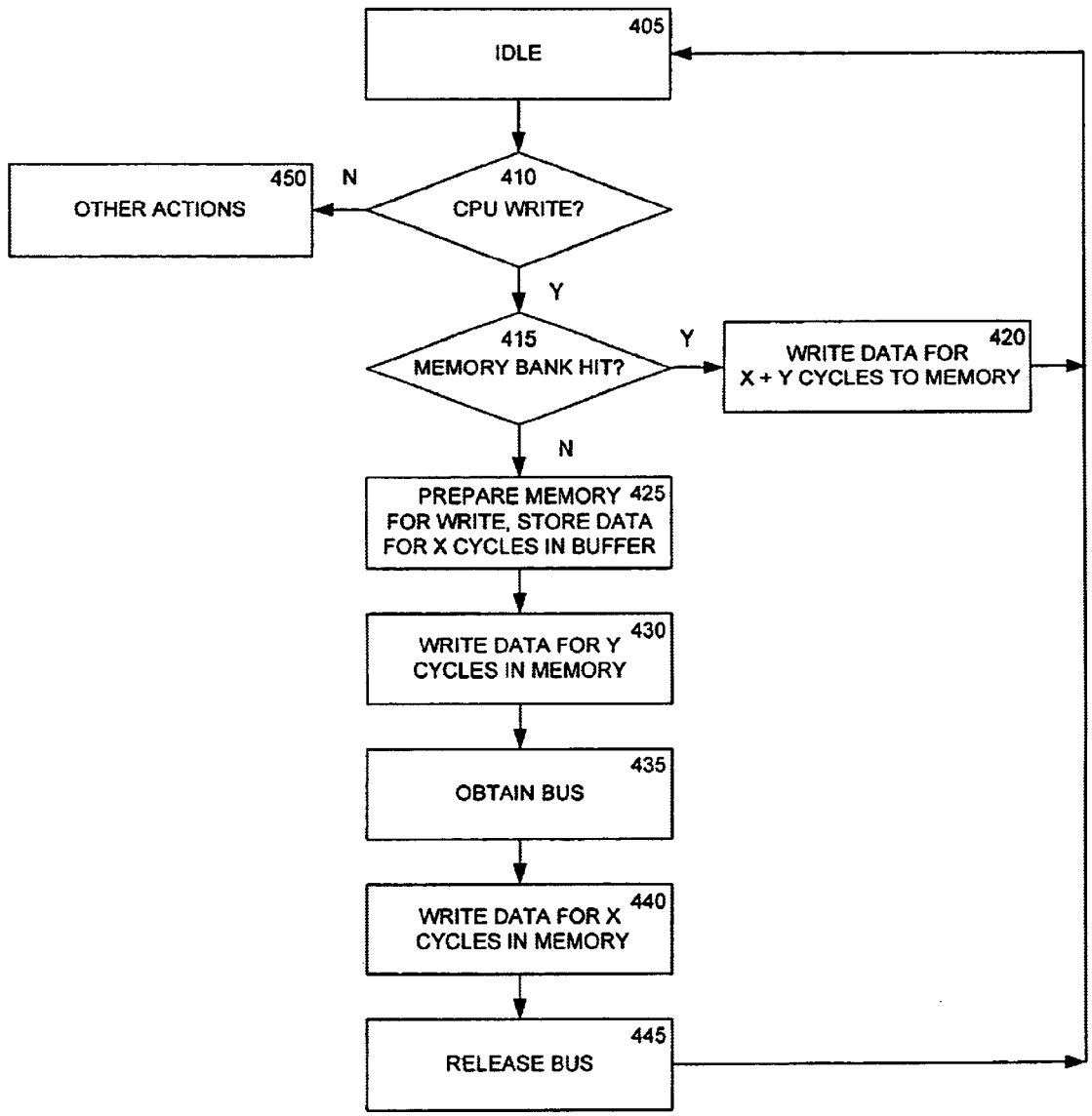
FIG. 4 is a flow diagram illustrating an embodiment of the invention.

An embodiment of the invention will now be described using the flow diagram illustrated in FIG. 4, and the block diagram of FIG. 3. At 405, the address and data buses are idle. At 410, memory controller 300 determines whether a processor, for example, has issued a burst write command to write a burst of data to memory. One skilled in the art will appreciate that a memory controller determines whether a burst write command has occurred by looking for a BLOCK WRITE command on the system command bus. If the memory controller determines that the processor has issued a burst write command, at 415, comparator 320 determines if the memory bank that is addressed by the processor is ready to receive data. In particular, comparator 320 determines if a memory hit has occurred by comparing the address tags for memory that has been precharged and activated with the address of memory that is being accessed. If comparator 320 determines that a memory hit has occurred, an immediate write to the memory bank at 420 occurs via address/data path 350. Buffer 335 is tristated at this time.

If comparator 320 determines that a memory 'miss' has occurred, i.e., the memory bank is unavailable to receive data, at 425 data is stored in buffer 330, and concurrently with storing data in the buffer, the memory bank addressed is precharged and activated to receive data. In particular, the output of comparator 320 causes finite state machine 325 to send $\overline{RAS},\overline{WE}$ signals to precharge and activate the SDRAM. At this time buffer 335 is in a tristate condition. At 430, the finite state machine 325 determines that the memory bank is ready to receive data, and data is written directly to the memory bank via address/data path 350. While data is being written to the memory bank, data is not written to buffer 330. At 435, the address/data bus is released and memory controller 300 obtains the bus. At 440, the memory controller writes the data words that were stored in buffer 330 to the memory bank by enabling buffer 335 by driving the OE line to buffer 335. In one embodiment, the memory controller writes the data words that were stored in the buffer to the memory bank in a memory unit that is contiguous with the data words that were written directly to the memory bank. In another embodiment, the apparatus writes the data words that were stored in the buffer to the memory bank in a memory unit that is not contiguous with the data words that were written directly to the memory bank. Thus, a data burst is stored in a memory bank in a shared bus architecture in an efficient manner.

Figure 7:
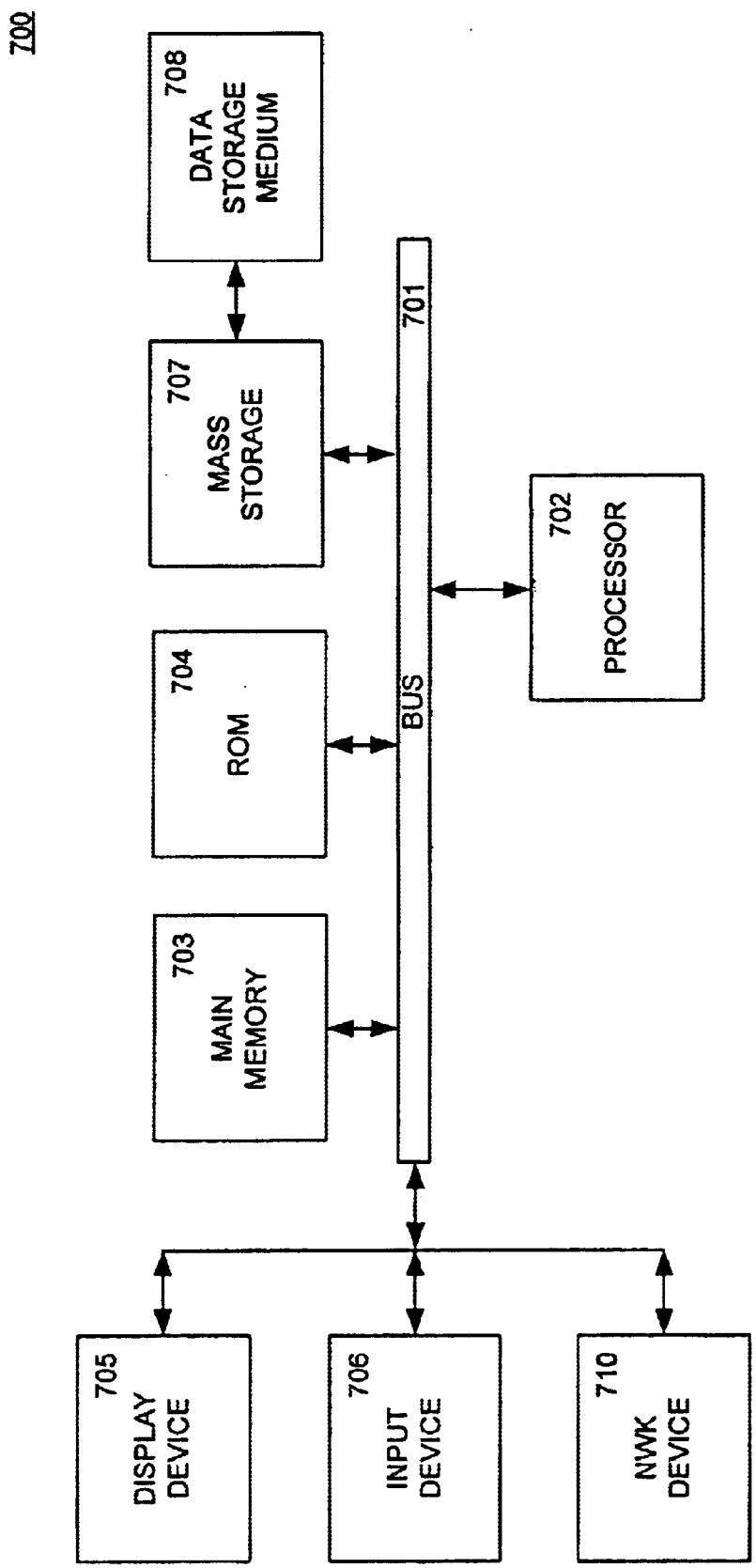
FIG. 7 illustrates a computer system employing an embodiment of the invention.

FIG. 7 illustrates a typical computer system 700 in which the present invention operates. One embodiment of the present invention is implemented on a personal computer (PC) architecture. It will be apparent to those of ordinary skill in the art that alternative computer system architectures or other processor, programmable or electronic-based devices may also be employed.

In general, such computer systems as illustrated by FIG. 7 comprise a bus 701 for communicating information, a processor 702 coupled with the bus 701 for processing information, main memory 703 coupled with the bus 701 for storing information and instructions for the processor 702, a read-only memory 704 coupled with the bus 701 for storing static information and instructions for the processor 702, a display device 705 coupled with the bus 701 for displaying information for a computer user, an input device 706 coupled with the bus 701 for communicating information and command selections to the processor 702, and a mass storage device 707, such as a magnetic disk and associated disk drive, coupled with the bus 701 ford storing information and instructions. A data storage medium 708 containing digital information is configured to operate with mass storage device 707 to allow processor 702 access to the digital information on data storage medium 708 via bus 701. The bus architecture employed by computer system 700 is a shared bus architecture.

Processor 702 may be any of a wide variety of general purpose processors or microprocessors such as the Pentium® processor manufactured by Intel® Corporation, or a MIPS processor manufactured by MIPS Technologies, Inc., of 2011 N. Shoreline Blvd, Mountain View, Calif. 94039-7311. It will be apparent to those of ordinary skill in the art, however, that other varieties of processors may also be used in a particular computer system. Display device 705 may be a liquid crystal device, cathode ray tube (CRT), or other suitable display device. Mass storage device 707 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 708 may be a hard disk, a floppy disk, a CD-ROM, a magnetic tape, or other magnetic or optical data storage medium.

In general, processor 702 retrieves processing instructions and data from a data storage medium 708 using mass storage device 707 and downloads this information into random access memory 703 for execution. Random access memory 703 may be a SDRAM. Processor 702, then executes an instruction stream from random access memory 703 or read-only memory 704. Command selections and information input at input device 706 may be used to direct the: flow of instructions executed by processor 702. Equivalent input device 706 may also be a pointing device such as a conventional mouse or trackball device. The results of this processing execution are then displayed on display device 705.

Computer system 700 includes a network device 710 for connecting computer system 700 to a network. Network device 710 for connecting computer system 700 to the network includes Ethernet devices, phone jacks and satellite links. It will be apparent to one of ordinary skill in the art that other network devices may also be utilized.

Embodiments of the invention may be represented as a software product stored on a machine-accessible medium (also referred to as a computer-accessible medium or a processor-accessible medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data. Those of ordinary skill in the art will appreciate that other instructions and operations necessary to implement the described invention may also be stored on the machine-accessible medium.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method comprising:

detecting a write data burst;

determining if at least one memory unit is available to receive the write data burst;

writing the write data burst to the at least one memory unit if the at least one memory unit is available to receive data;

storing a first portion of the write data burst in a buffer, concurrently with activating the at least one memory unit to receive data, if the at least one memory unit is not available to receive data;

writing a second portion of the write data burst to the at burst one memory unit when the at least one memory unit is available to receive date without storing the second portion in the buffer; and writing the first portion of the write data burst from the buffer to the at least one memory unit after writing the second portion of the write data burst.

2. The method of claim 1 wherein the write data burst comprises at least eight data words.

3. The method of claim 1 wherein the first position write data burst comprises at least one data word.

4. The method of claim 1, wherein the write data burst comprises a write data burst during a processor's burst write mode.

5. The method of claim 1, wherein the method is used in a shared bus architecture.

6. The method of claim 1, wherein the first portion of the write data burst and the second portion of the write date burst are stored in contiguous memory locations.

7. The method of claim 1, wherein the first portion of the write data burst and the second portion of the write data burst are stored in non-contiguous memory locations.

8. The method of claim 1, wherein the at least one memory unit comprises a Synchronous Dynamic Random Access Memory (SDRAM) bank.

9. An apparatus comprising:
a circuit to detect a write data burst to at least one memory units to determine if the at least one memory unit is available to receive data, and to write the write data burst to the at least one memory unit if the at least one memory unit is available to receive data;
a buffer communicatively coupled to the circuit to temporarily store a first portion of the write data burst if the at least one memory unit is not available to receive data; and
the circuit to concurrently detect availability of the memory unit, to activate the at least one memory unit to store a second portion of the write data burst without storing the second portion in the buffer, the circuit to further store the first portion of the write data burst from the buffer to the at least one memory unit after storing the second portion of the write data burst in the at least one memory unit when the at least one memory unit is available to receive date.

10. The apparatus of claim 9, wherein the write data burst comprises at least eight data words.

11. The apparatus of claim 9, wherein the first portion of the write data burst comprises at least one data word.

12. The apparatus of claim 9, wherein the write data burst comprises a sequence of data words output during a processor's burst write node.

13. The apparatus of claim 9, wherein the apparatus is used in a shared bus architecture.

14. The apparatus of claim 9, wherein the first portion of the write data burst and the second portion of the write data burst are stored in contiguous memory locations.

15. The apparatus of claim 9, wherein the first portion of the write data burst and the second portion of the write data burst are stored in non-contiguous memory locations.

16. The apparatus of claim 9 wherein the at least one memory unit comprises a Synchronous Dynamic Random Access Memory (SDRAM) bank.

17. An apparatus comprising:
means for detecting a write data burst means for determining if at least one memory unit is available to receive the write data burst;
means for writing the write data burst to the at least one memory unit if the at least one memory unit is available to receive data;
means for storing a first portion of the write data burst in a buffer, concurrently with activating the at least one memory unit to receive data, if the at least one memory unit is not available to receive data;
means for writing a second portion of the write data burst to the at least one memory unit when the at least one memory unit is available to receive data without storing the second portion in the buffer; and
means for writing the first portion of the write data burst from the buffer to the at least one memory unit after writing the second portion of the write data burst.

18. The apparatus of claim 17, wherein the means for writing the write data burst to the at east one memory unit if the at least one memory unit is available to receive data comprises means for writing at least eight data words in the at least one memory unit during a burst write operation.

19. The apparatus of claim 17, wherein the means for storing a first portion of the write data burst in a buffer concurrently with activating the at least one memory unit to receive data comprises means for storing at least one data word in the buffer.

20. A computer system comprising:
a memory controller to detect a write data burst to at least one memory unit, to determine if the at least one memory unit is available to receive data, and to write the write data burst to the at least one memory unit if the at least one memory unit is available to receive data;
a buffer communicatively coupled to the memory controller to temporarily store a first portion of the write data burst if the at least one memory unit is not available to receive data; and
the memory controller to concurrently detect availability of the memory unit, to activate the at least one memory unit to store a second portion of the write data burst without storing the second portion in the buffer, the circuit to further store the first portion of the write data burst from the buffer to the at least one memory unit after storing the second portion of the write data burst in the at least one memory unit when the at least one memory unit is available to receive data.

21. The computer system of claim 20, wherein the write data burst comprises a write data burst output during a processor's burst write mode.

22. The computer system of claim 20, further comprising the buffer to store at least one data word.

23. The computer system of claim 20, further comprising the computer system using a shared bus architecture.

24. An article of manufacture comprising:
a machine-accessible mediums including instructions that when executed by a machine, causes said machine to perform operations comprising: detecting a write data burst;
determining if at least one memory unit is available to receive the write data burst;
writing the write data burst to the at least one memory unit if the at least one memory unit is available to receive data;
storing a first portion of the write data burst in a buffer, concurrently with activating the at least one memory unit to receive data, if the at least one memory unit is not available to receive data;
writing a second portion of the write data burst to the at least one memory unit when the at least one memory unit is available to receive data without storing the second portion in the buffer; and writing the first portion of the write data burst from the buffer to the at least one memory unit after writing the second portion of the write data burst.

25. The article of manufacture of claim 24, wherein said instructions for writing the write data burst to the at least one memory unit if the at least one memory unit is available to receive data, includes further instructions to write at least eight data words to the at least one memory unit during a burst write operation.

26. The article of manufacture of claim 24, wherein said instructions for storing a first portion of the write data burst in a buffer, concurrently with activating the at least one memory unit to receive data, includes further instructions to store at least one data word in the buffer.

27. The article of manufacture of claim 24, wherein said article of manufacture is used in a shared bus architecture.

28. An apparatus comprising:
   a register to store address information of a memory unit that is available to receive data;
   a comparator to compare address information from the register with address information of a memory unit that is being accessed, the output of the comparator to drive a finite state machine;
   a buffer, communicatively coupled to the FSM to temporarily store a first portion of a write data burst if memory is not available to receive data;
   the FSM to enable the memory being accessed if the memory is not available to receive data, the memory to store a second portion of the sprite data burst when the memory being accessed is available to receive data without storing the second portion in the buffer; and
   the finite state machine to store the first portion of the write data burst from the buffer to the memory being accessed after storing the second portion of the write data burst.

29. The apparatus of claim 28, wherein the write dicta burst comprises at least eight data words.

30. The apparatus of claim 28, wherein the first position of the write data burst comprises at least one date word.

31. The apparatus of claim 28, wherein the memory comprises Synchronous Dynamic Random Access Memory (SDRAM).

* * * * *